US 9,315,188 B2

(12) United States Patent
Reed et al.

(10) Patent No.: US 9,315,188 B2
(45) Date of Patent: Apr. 19, 2016

(54) METHODS AND SYSTEMS FOR DRIVELINE TORQUE CONTROL

(71) Applicant: Ford Global Technologies, LLC, Dearborn, MI (US)

(72) Inventors: Dennis Craig Reed, Dexter, MI (US); Robert Wright, Royal Oak, MI (US); Daniel Colvin, Farmington Hills, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 14/156,322

(22) Filed: Jan. 15, 2014

(65) Prior Publication Data
US 2015/0197236 A1    Jul. 16, 2015

(51) Int. Cl.
*B60W 20/00* (2006.01)
*B60W 10/06* (2006.01)
*B60W 10/08* (2006.01)
*B60W 10/26* (2006.01)
*B60K 6/48* (2007.10)

(52) U.S. Cl.
CPC ............... *B60W 20/106* (2013.01); *B60K 6/48* (2013.01); *B60W 10/06* (2013.01); *B60W 10/08* (2013.01); *B60W 10/26* (2013.01); *B60W 20/102* (2013.01); *B60K 2006/4825* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 8,261,864 B2 | 9/2012 | Bhattarai et al. | |
| 2001/0041955 A1* | 11/2001 | Nada | B60K 6/445 701/29.2 |
| 2009/0118914 A1 | 5/2009 | Schwenke et al. | |
| 2009/0283070 A1 | 11/2009 | Whitney et al. | |
| 2010/0108032 A1* | 5/2010 | Pursifull | B60W 10/06 123/406.12 |
| 2010/0162686 A1* | 7/2010 | Miyashita | B60K 6/24 60/274 |

* cited by examiner

*Primary Examiner* — John R Olszewski
*Assistant Examiner* — Jess Whittington
(74) *Attorney, Agent, or Firm* — David Kelley; Alleman Hall McCoy Russell & Tuttle LLP

(57) ABSTRACT

Systems and methods for improving operation of a hybrid vehicle are presented. In one example, driveline oscillations are reduced during engine air-fuel ratio modulation. The driveline oscillations may be reduced via adjusting torque of a motor.

6 Claims, 5 Drawing Sheets

METHODS AND SYSTEMS FOR DRIVELINE TORQUE CONTROL

FIELD

The present description relates to a system and methods for improving driveline torque control for a vehicle. The methods may be particularly useful during engine idle and heavy load conditions where driveline torque disturbances may be more noticeable.

BACKGROUND AND SUMMARY

An air-fuel ratio of an engine may be varied rich and lean of stoichiometric conditions to improve efficiency of a three-way catalyst located in the engine's exhaust passage. The engine air-fuel ratio is often varied at a predetermined frequency and amplitude. Operating the engine rich provides hydrocarbons and CO to the three-way catalyst for reducing exhaust gas constituents such as NOx. Conversely, operating the engine lean provides oxygen to the three-way catalyst for oxidizing hydrocarbons and CO. However, operating an engine rich of stoichiometry may increase engine output torque while operating the engine lean of stoichiometry may decrease engine output torque. Consequently, varying the engine air-fuel ratio may disturb torque transmitted by the engine to the driveline, and a driver of the vehicle may find the torque disturbances objectionable.

The inventors herein have recognized the above-mentioned disadvantages and have developed a method for operating a driveline, comprising: varying an engine air-fuel ratio; and adjusting torque of a motor supplying torque to the driveline in response to varying the engine air-fuel ratio.

By adjusting torque supplied by a motor to a driveline when engine torque is varying due to engine air-fuel ratio changes, it may be possible to smooth engine torque so that the technical results of increasing catalyst efficiency and decreasing driveline torque oscillations may be provided. Further, if a battery state of charge (SOC) is less than a threshold level for a battery supplying power to the motor, the possibility of producing driveline torque oscillations may be reduced via adjusting engine spark timing in response to the engine air-fuel ratio.

The present description may provide several advantages. In particular, the approach may reduce driveline torque disturbances of a hybrid driveline. Further, the approach may improve vehicle drivability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
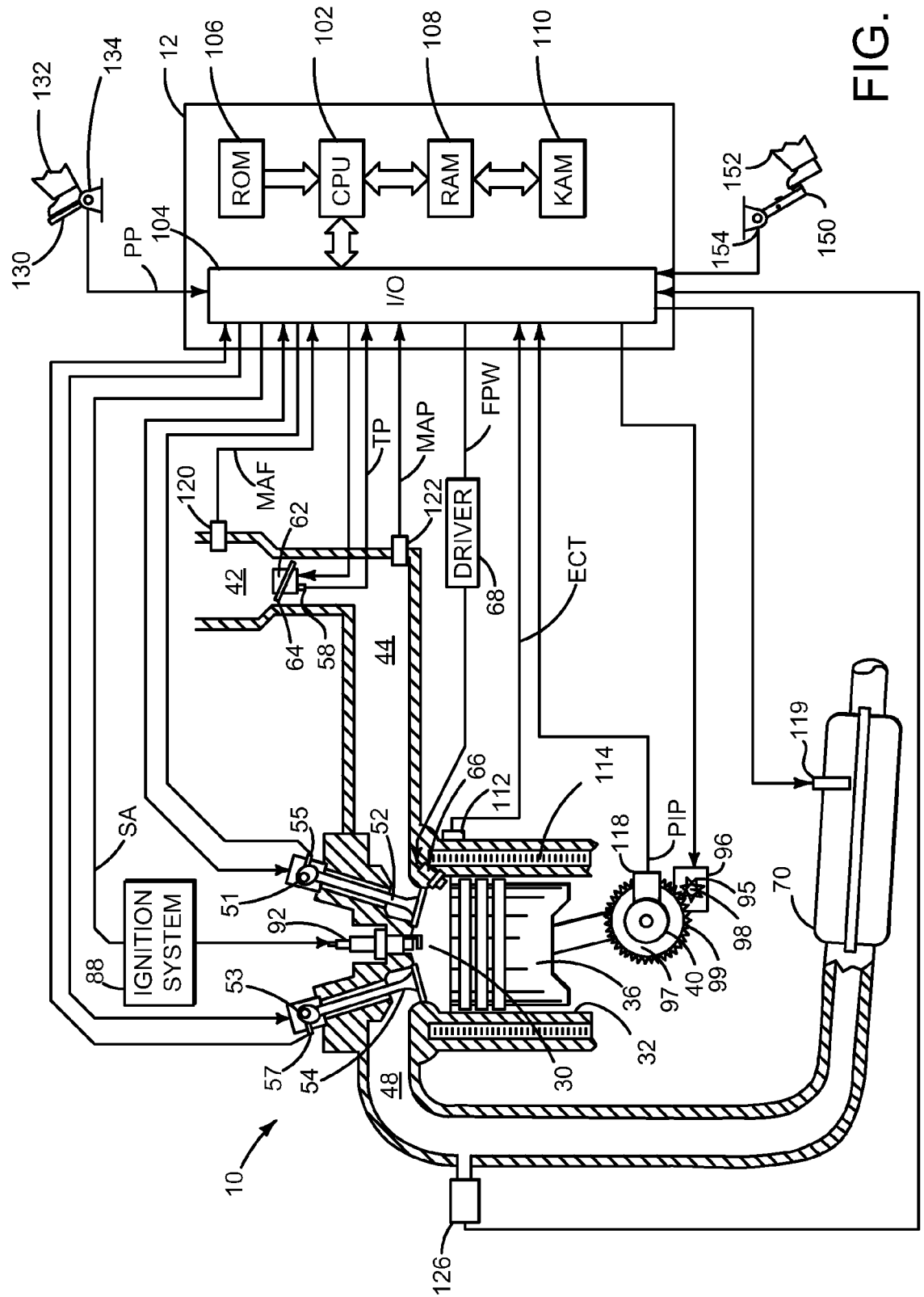
FIG. 1 is a schematic diagram of an engine.
Figure 2:
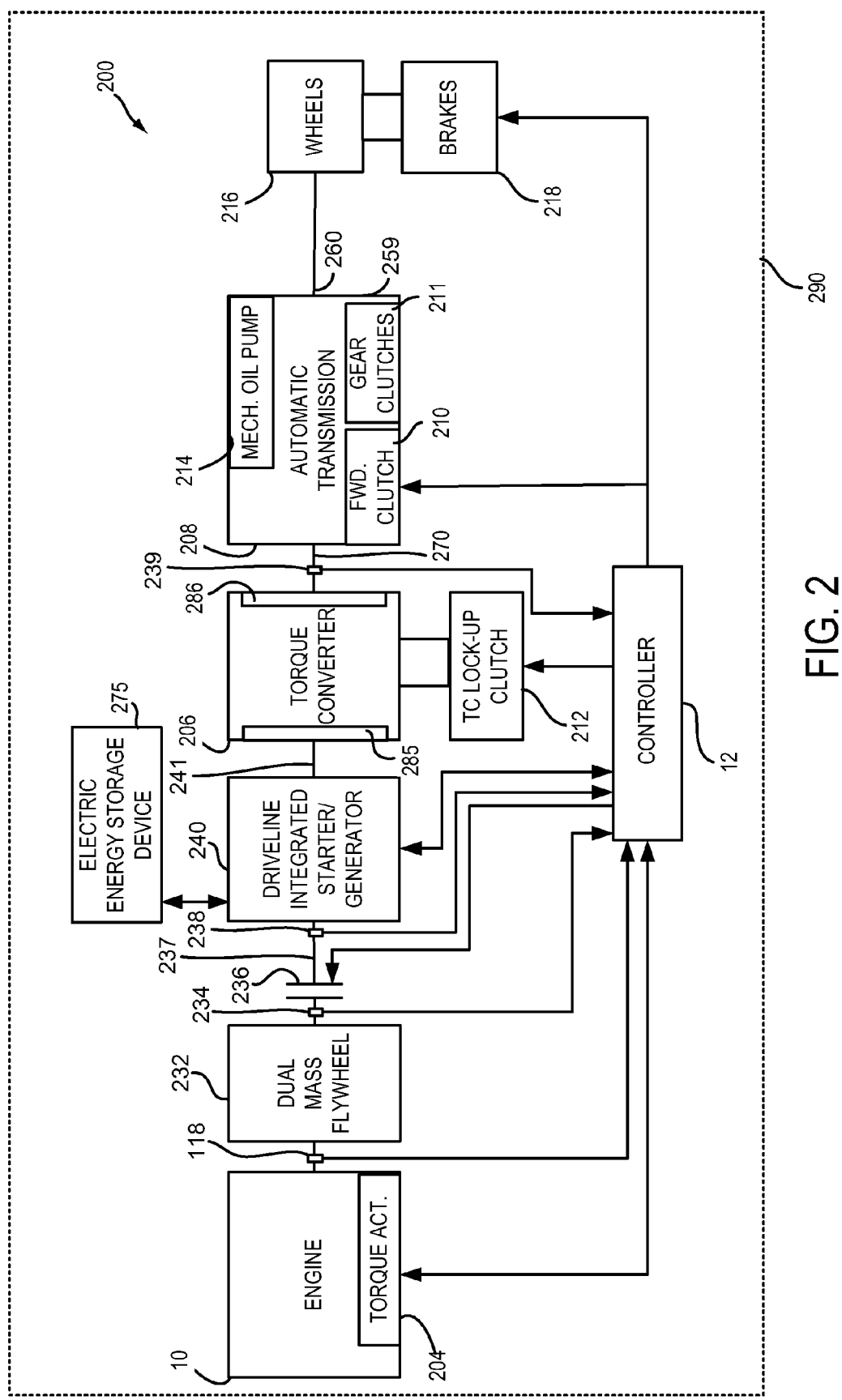
FIG. 2 is shows an example vehicle driveline configuration.
Figure 3:
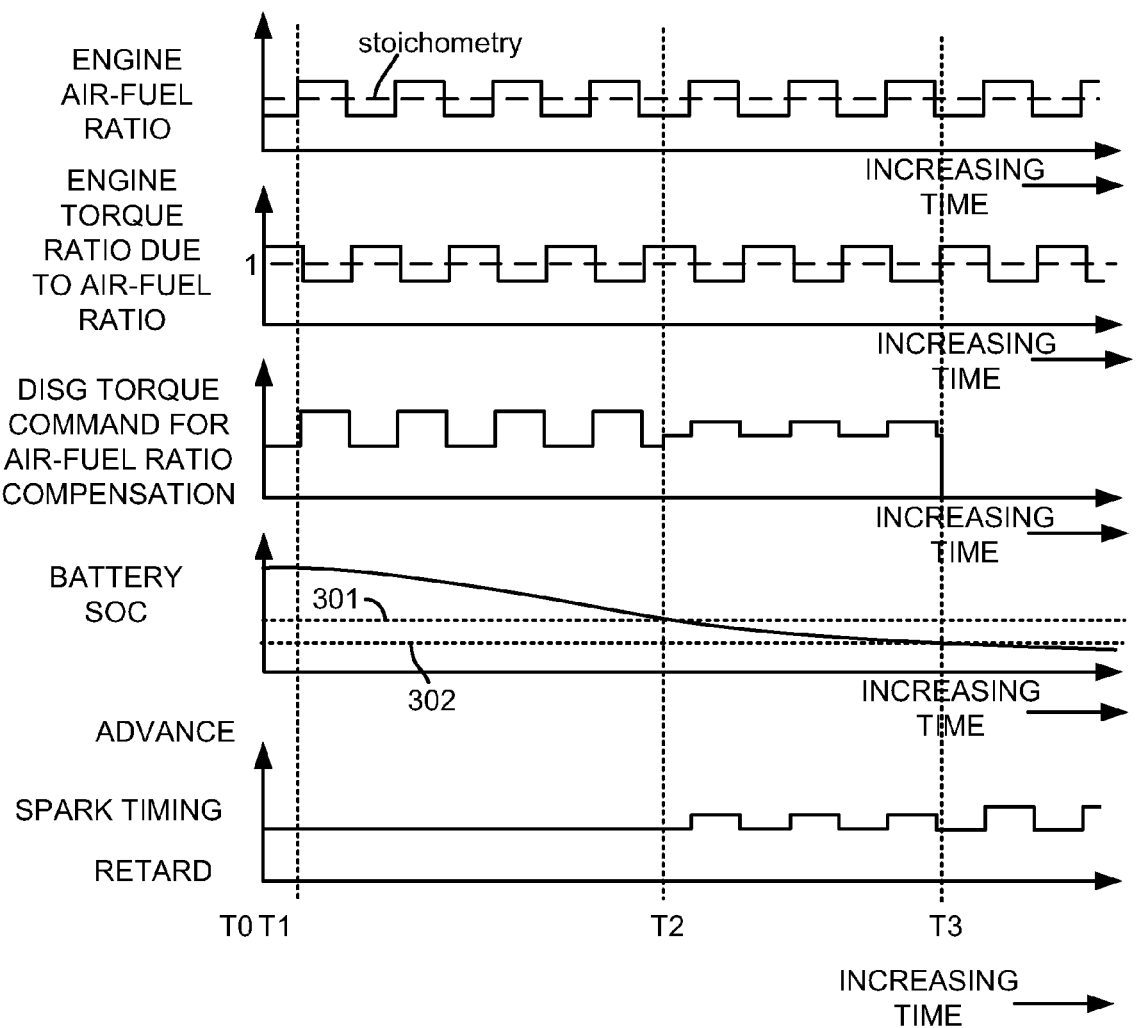
FIG. 3 is shows an example simulated driveline torque control sequence.

The present description is related to controlling driveline torque of a hybrid vehicle. The driveline may include an engine as is shown in FIG. 1. The engine may be mechanically coupled to other vehicle components to form a driveline as is shown in FIG. 2. Driveline torque may be controlled as shown in the torque control sequence illustrated in FIG. 3. The system of FIGS. 1 and 2 may be operated according to the method of FIG. 4 to control driveline torque as shown in FIG. 3. Driveline torque may be smoothed by providing a motor torque to the driveline that is equal and opposite to the torque provided to the driveline that results from engine air-fuel modulation. Timing of a motor torque command may be adjusted according to delays in the system as shown.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO)

sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Referring now to FIG. 3, a simulated driveline operating sequence is shown. The operating sequence of FIG. 3 may be provided by the system of FIGS. 1 and 2 when instructions according to the method of FIG. 4 stored in non-transitory memory are executed. Vertical markers T0-T3 represent times of interest during the sequence.

The first plot from the top of FIG. 3 is a plot of engine air-fuel ratio versus time. The X axis represents time and time increases from the left side of FIG. 3 to the right side of FIG. 3. The Y axis represents engine air fuel ratio and the engine air-fuel ratio is leaner in the direction of the Y axis arrow. The horizontal line indicated as stoichiometry represents a stoichiometric air-fuel ratio.

The second plot from the top of FIG. 3 is a plot of engine torque ratio due to air-fuel ratio versus time. The X axis represents time and time increases from the left side of FIG. 3 to the right side of FIG. 3. The Y axis represents engine torque ratio due to air-fuel ratio and the engine torque ratio due to air-fuel ratio is increased in the direction of the Y axis arrow.

The third plot from the top of FIG. 3 is a plot of a motor or DISG torque command for air-fuel compensation versus time. The X axis represents time and time increases from the left side of FIG. 3 to the right side of FIG. 3. The Y axis represents motor or DISG torque and DISG torque increases in the direction of the Y axis arrow. The DISG torque command for air-fuel compensation is a multiplier that varies about a value of one in response to the engine air-fuel ratio. A value greater than one is provided when the engine air-fuel ratio is lean of stoichiometry to increase DISG output to provide a driveline net torque that is not reduced due to the engine air-fuel ratio being lean of stoichiometry. A value less than one is provided when the engine air-fuel ratio is rich of stoichiometry to decrease DISG output to provide a driveline net torque that is not increased due to the engine air-fuel ratio being rich of stoichiometry. The DISG torque command for air-fuel compensation is a value of one when the engine operates at stoichiometry.

The fourth plot from the top of FIG. 3 is a plot of battery state of charge (SOC) versus time. The X axis represents time and time increases from the left side of FIG. 3 to the right side of FIG. 3. The Y axis represents battery SOC and battery SOC increases in the direction of the Y axis arrow. Battery SOC may be estimated from battery voltage or via coulomb counting. Horizontal line 301 represents a first level threshold SOC below which DISG torque output is limited or reduced to conserve battery energy. Horizontal line 302 represents a second level threshold SOC below which DISG torque output is limited or reduced to conserve battery energy.

The fifth plot from the top of FIG. 3 is a plot of engine spark timing versus time. The X axis represents time and time increases from the left side of FIG. 3 to the right side of FIG. 3. The Y axis represents engine spark timing and engine spark timing is advanced in the direction of the Y axis arrow.

At time T0, the engine is operating and combusting an air-fuel ratio that varies over time. The air-fuel ratio may vary based on an empirically determined forcing frequency and amplitude. In one example, the forcing frequency varies with catalyst space velocity which is estimated based on engine speed and load. The engine torque ratio varies as the engine air-fuel ratio varies and it is computed by the controller as described in the method of FIG. 4. The torque command for the motor or DISG is less than a value of one to reduce motor torque as engine torque is increased due to operating the engine with a rich air-fuel mixture. In this way, the increase in engine torque and the decrease in DISG torque provide a net torque of zero so that the desired driver demand torque may be provided via the engine and/or DISG without the net torque varying in response to the varying engine air-fuel ratio. The battery SOC is at a higher level and the engine spark timing is at a constant middle value (e.g., advanced 25 crankshaft degrees from top-dead-center compression stroke of the cylinder receiving the spark).

At time T1, the engine air-fuel ratio switches from rich of stoichiometry to lean of stoichiometry. The engine torque ratio and the DISG torque command for air-fuel compensation also transition in response to the change in engine air-fuel ratio. In particular, the engine torque ratio changes from a value greater than one to a value of less than one to indicate that the engine torque output is reduced in response to the change in engine air-fuel ratio. The DISG torque command for air-fuel compensation also change to a value greater than one so that the DISG torque will be increased to counteract the decrease in engine torque so that the desired driver demand torque may be provided to the driveline via the engine and/or the motor. The battery SOC is shown being slowly reduced as the DISG produces torque in response to the engine torque ratio, thereby adjusting for the change in engine torque due to the engine air-fuel ratio. The engine speed and driver demand torque (not shown) remain constant. The engine spark timing remains at a constant value since time T0.

Between time T1 and time T2, the engine air-fuel ratio, engine torque ratio, and DISG torque command for engine air-fuel ratio compensation oscillate as a function of time. The battery SOC continues to decrease as the DISG continues to supply torque to reduce torque fluctuations in the driveline that may result from engine air-fuel variation. The engine spark timing remains at a constant value.

At time T2, the battery SOC is reduced to a level lower than the first battery SOC threshold 301. The DISG or motor engine torque command for engine air-fuel compensation is reduced so as to reduce torque output by the DISG to conserve battery charge. The engine air-fuel ratio and the engine torque ratio continue at the same levels as before time T2. The engine spark timing is adjusted as engine air-fuel ratio varies to provide increased engine torque when the engine air-fuel ratio is lean so that engine torque is not reduced as much as compared to when the engine is operated at constant spark timing. Thus, the DISG torque and the engine spark timing are varied to smooth the net driveline torque and thereby provide driveline torque as if the engine were operating at stoichiometry rather than oscillating about stoichiometry. The battery SOC continues to decrease, but at a lower rate.

Between time T2 and time T3, the engine air-fuel ratio, engine torque ratio due to air-fuel ratio, engine spark timing, and DISG torque command for engine air-fuel ratio compensation oscillate as a function of time. The battery SOC continues to decrease as the DISG continues to supply torque to reduce torque fluctuations in the driveline that may result from engine air-fuel variation. The engine spark timing remains at a constant value.

At time T3, the battery SOC is reduced to a level lower than the second battery SOC threshold 302. The DISG or motor engine torque command for engine air-fuel compensation is adjusted to a value of zero so as to eliminate DISG torque added to the driveline to smooth out net driveline torque variation that may be caused by engine air-fuel ratio variation. The engine air-fuel ratio and the engine torque ratio continue at the same levels as before time T3. The engine spark timing is adjusted as engine air-fuel ratio varies to provide increased engine torque when the engine air-fuel ratio is lean so that engine torque is not reduced as much as compared to when the engine is operated at constant spark timing. In this way, engine spark timing is adjusted and DISG torque is not adjusted in response to battery SOC being less than a second threshold charge. The battery SOC remains at a constant level since battery charge is not used to compensate driveline torque produced via engine air-fuel ratio variation.

In this way, DISG torque is adjusted to provide a smoothed net driveline torque and offset (e.g., compensate for engine torque loss or increase due to engine air-fuel ratio by providing or reducing driveline torque in the same but opposite amount as the engine torque change attributed to engine air-fuel ratio variation) engine air-fuel ratio variation. Further, engine spark timing may be adjusted responsive to battery SOC and engine air-fuel ratio to provide a smoother net driveline torque when battery SOC is low and DISG torque is limited to reduce charge drained from the battery.

Figure 4:
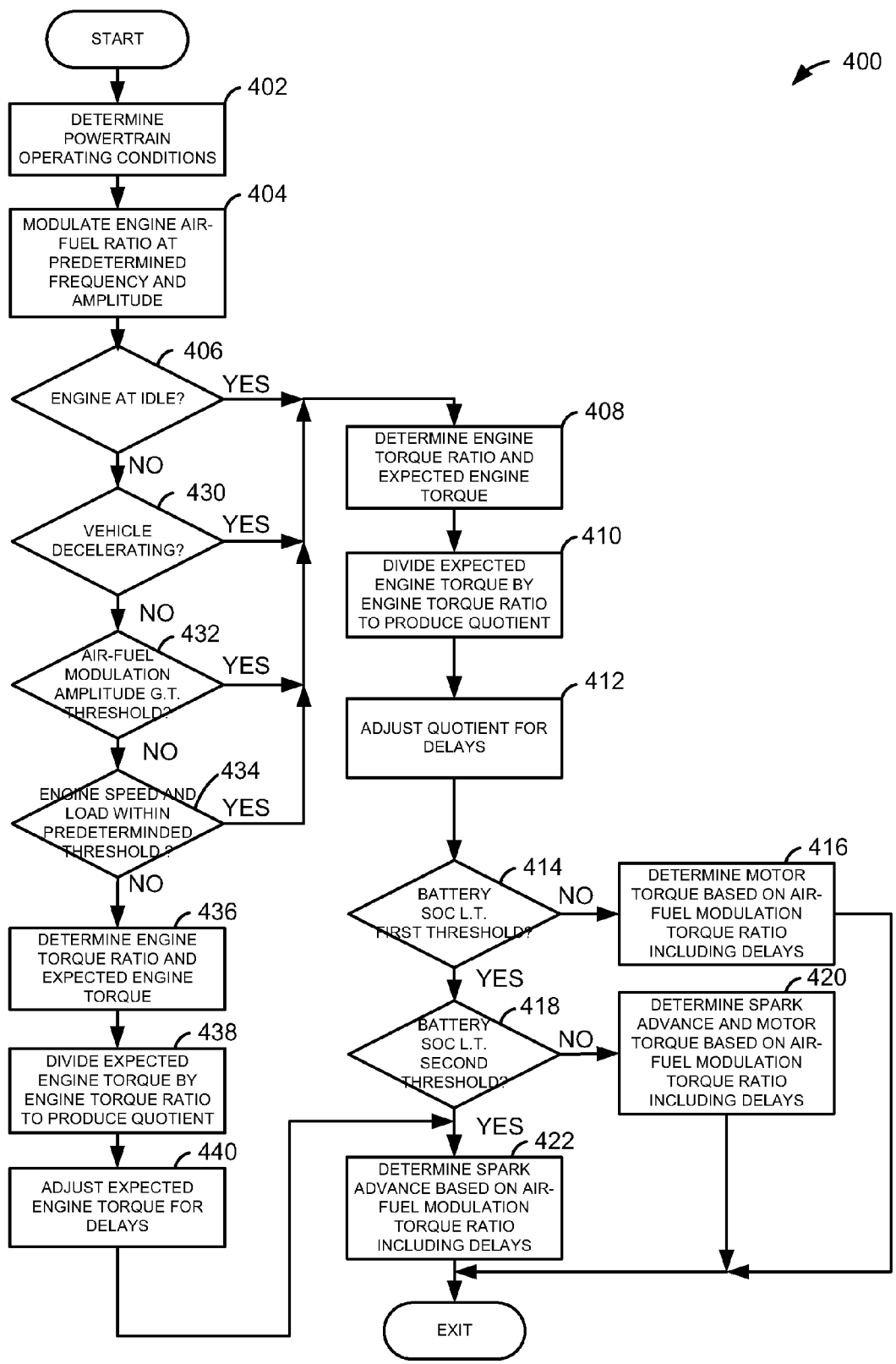
FIG. 4 is a flowchart of an example method for controlling driveline torque.

Referring now to FIG. 4, a method for controlling driveline torque is shown. The method of FIG. 4 may be applied in the system of FIGS. 1 and 2. Method 400 may be implemented as executable instructions stored in non-transitory memory. Additionally, method 400 may provide the operating sequence illustrated in FIG. 3.

At 402, method 400 determines powertrain operating conditions. Powertrain operating conditions may include but are not limited to engine speed, engine load (e.g., inducted engine air amount divided by theoretical engine air amount), engine temperature, battery SOC, driver demand torque, vehicle speed, and engine air-fuel ratio. Powertrain operating conditions may be determined via sensors, models, or other estimates. Method 400 proceeds to 404 after powertrain operating conditions are determined.

At 404, method 400 modulates the engine air-fuel ratio at a predetermined frequency and amplitude to provide a desired engine air-fuel ratio. The predetermined frequency and amplitude may be empirically determined and stored in memory in a table or function. The table or function may be indexed via engine speed and load. Method 400 proceeds to 406 after the engine air-fuel modulation is provided.

At 406, method 400 judges whether or not the engine is at idle conditions. The engine may be judged to be at idle when engine speed is within a predetermine speed range (e.g., 600 and 700 RPM) and engine load is within a predetermined engine load range (e.g., 0.1-0.12). If method 400 judges that the engine is operating at idle conditions, the answer is yes and method 400 proceeds to 408. Otherwise, the answer is no and method 400 proceeds to 430.

At 408, method 400 determines the engine torque ratio and the present expected engine torque. The engine torque ratio is engine brake torque at desired or commanded air-fuel ratio divided by engine brake torque at stoichiometric conditions. In one example, engine output brake torque for stoichiometric conditions is empirically determined and stored in tables and/or functions that are indexed according to the engine's present engine speed and load or torque. The tables and/or function output stoichiometric engine brake torque when the tables are indexed via engine speed and load. Additionally, method 400 determines the expected engine brake torque at the present desired engine air-fuel ratio. The expected engine brake torque at the present desired engine air-fuel ratio is based on empirically determined values that are stored in a three dimensional table that is indexed by engine speed, engine load, and present engine air-fuel ratio. The table outputs the present expected engine brake torque based on engine speed, engine load, and engine air-fuel ratio. Method 400 proceeds to 410 after engine brake torque for stoichiometric conditions is output.

At 410, method 400 divides the present expected engine brake torque by the engine torque ratio to produce a quotient. The quotient is a value that varies as the engine air-fuel varies, and it is the basis for adjusting the DISG torque and/or spark timing. The quotient is updated for each cylinder combustion event and a vector of quotients for a series of engine combustion events is the basis for adjusting the DISG torque. The vector of quotients varies as engine air-fuel ratio varies. Method 400 proceeds to 412 after the quotient is determined.

Figure 5:
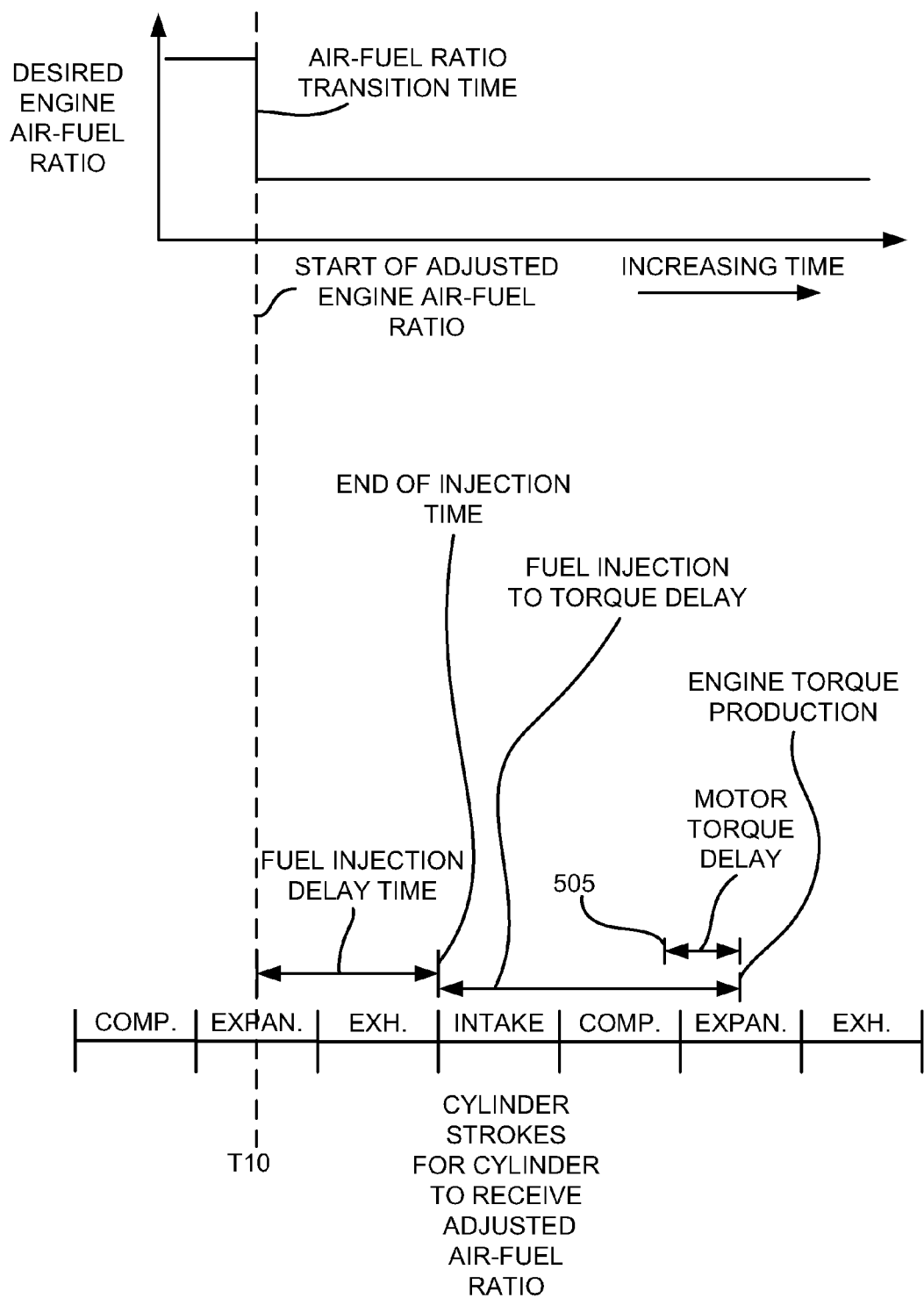
FIG. 5 is an example of DISG torque adjustment based on engine air-fuel ratio.

At 412, method 400 adjusts the timing that the quotient is available to the DISG for adjusting DISG output torque. For example, timing of output of a quotient having a value that reflects or corresponds to a change in engine air-fuel ratio to a DISG or motor is adjusted so that a time of change in motor torque is a same time as a change in time or engine torque. FIG. 5 shows an example of adjusting DISG command timing so that engine torque changes and motor torque changes may be synchronized so that the net driveline torque change due to the engine air-fuel ratio change approaches zero. Since engine air-fuel ratio may transition from one air-fuel ratio to a different air-fuel ratio from cylinder fuel injection event to the next cylinder fuel injection event, the time that a new quotient is available for adjusting DISG torque is changed so that the DISG torque is adjusted at the time the engine torque changes responsive to the change in engine air-fuel ratio. For example, if the desired engine air-fuel ratio changes from rich to lean, the command to increase DISG or motor torque or current adjustment to the DISG is delayed from the time desired engine air-fuel ratio changes to lean in response to the fuel injection delay, the fuel to torque delay, and the DISG torque delay. Likewise, if the desired engine air-fuel ratio changes from lean to rich, the command to decrease DISG or motor torque or current adjustment to the DISG is delayed from the time desired engine air-fuel ratio changes to lean in response to the fuel injection delay, the fuel to torque delay, and the DISG torque delay. In this way, driveline torque may be smoothed even in the presence of air-fuel modulation that causes engine torque variation.

The timing that the updated quotient is available or sent to the DISG is adjusted to account for a fueling delay, a fuel to torque delay, and motor torque delay. The fueling delay is an amount of time it takes to inject fuel to a cylinder. For example, for a four cylinder engine operating at 600 RPM the fueling delay may be 0.005 seconds. A maximum fueling delay at 600 RPM is 1/cylinder rate, where cylinder rate is 1/60 (e.g., conversion from minutes to seconds) multiplied by the number of cylinders per engine revolution (e.g., 2 for a four cylinder engine), is 0.05 seconds. The fuel injection delay is the time duration of the fuel injection amount and the end of fuel injection is the beginning of the fuel injection to engine torque delay.

The fuel to torque delay is the amount of time it takes for injected fuel to affect engine torque. Continuing the example of a four cylinder engine operating at 600 RPM, where the end of fuel injection is at top-dead-center intake stroke of the cylinder receiving fuel, the fuel torque delay includes 180 crankshaft degrees for the intake stroke, 180 crankshaft degrees for the compression stroke, and 90 crankshaft degrees for the power stroke. Therefore, the fuel to torque delay is 450 crankshaft degrees multiplied by 0.2777 crankshaft degrees per millisecond (e.g., degrees at 600 RPM), or 0.125 seconds of fuel to torque delay. The total delay from start of injection to engine torque production is then 0.13 seconds (e.g., the fueling delay 0.005 seconds plus the fuel to torque delay of 0.125 seconds). Thus, the fuel injection to engine torque delay may be determined by determining or counting the number of crankshaft degrees between end of fuel injection and a predetermined or determined crankshaft angle during the cylinder's expansion stroke. The number of crankshaft degrees divided by the engine speed in crankshaft degrees provides the fuel injection to engine torque delay.

The motor torque delay is then subtracted from the delays associated with fuel injection delay and the fuel injection to torque production delay. In one example, the motor torque delay is empirically determined and stored in a table that is indexed based on motor speed. In one example, the motor torque delay at 600 RPM is 0.03 seconds. Consequently, the quotient is delayed 0.1 seconds (e.g., 0.13 seconds (injection and torque production delays) minus 0.03 seconds) from the time desired engine air-fuel ratio is determined for a cylinder until the time the quotient is provided to the DISG.

The desired air-fuel ratio for each cylinder is determined by indexing tables and/or functions using driver demand torque, engine speed. The tables output a fuel injection amount, and the fuel injection amount is further adjusted by a catalyst fuel modulation amount (e.g., frequency and amplitude). The timing of fuel injection relative to engine crankshaft position is determined at the same time and the fuel injection timing is determined by indexing tables and/or functions that hold empirically determined fuel injection end of injection times for each cylinder. The tables and/or functions are indexed using driver demand torque and engine speed. The fuel injection amount is converted from a time into crankshaft degrees and the result is added to the engine fuel injection time retrieved from the tables to determine start of fuel injection time. The start and end of fuel injection for each cylinder define the fuel injection delay for adjusting timing of when the updated torque command is sent to the DISG for each time fuel is injected to an engine cylinder. The timing of outputting the DISG torque command to the DISG is based on the fuel injection delay time, the fuel injection to engine torque delay, and the DISG torque delay. The DISG torque command is output after the combined delays of fuel injection, fuel injection to engine torque, and DISG torque delay have passed since the desired air-fuel ratio of a cylinder has been determined. It should be noted that the DISG torque delay may reduce the sum of the fuel injection delay and the fuel injection to engine torque delay if the DISG torque delay is less than the sum of the fuel injection delay and the fuel injection to engine torque delay.

The timing that the quotient is available to adjust the DISG torque is assessed for each engine cylinder event (e.g., each injection event) and the appropriate engine, fuel to torque, and motor torque delays are included in determining the time that the quotient is made available to the DISG so that DISG torque is adjusted responsive to engine air-fuel ratio changes from lean to rich or vice versa. Method 400 proceeds to 414 after the timing that the quotient is available to the DISG is adjusted.

At 414, method 400 judges whether or not battery state of charge (SOC) is less than (L.T.) a first threshold value. The first threshold value may be 40% of the maximum battery SOC. The battery SOC may be estimated from battery voltage or by counting coulombs. If method 400 judges that battery SOC is less than the first threshold, the answer is yes and method 400 proceeds to 420. Otherwise, the answer is no and method 400 proceeds to 416.

At 416, method 400 determines DISG or motor torque in response to the quotient determined at 410 and the delays determined at 412. The DISG torque is determined by multiplying the quotient and the engine torque produced at stoichiometric conditions determined at 408, and then subtracting the engine torque produced at stoichiometric conditions. The result is a torque change amount that is the basis for adjusting the DISG torque. Current supplied to the DISG is adjusted according to torque change amount each time desired air-fuel ratio for each cylinder is determined (e.g., prior to each cylinder combustion event). In this way, the DISG torque is adjusted to cancel or smooth engine torque fluctuations that may result from engine air-fuel ratio changes. The DISG torque command may be a combination of the torque change amount and a base DISG torque amount that is based on a percentage of driver demand torque that is provided by the DISG. Thus, the DISG torque may be modulated at the same rate as the engine air-fuel ratio. The DISG torque is adjusted and method 400 proceeds to exit.

At 418, method 400 judges whether or not battery state of charge (SOC) is less than (L.T.) a second threshold value. The second threshold value may be 30% of the maximum battery SOC. The battery SOC may be estimated from battery voltage or by counting coulombs. If method 400 judges that battery SOC is less than the second threshold, the answer is yes and method 400 proceeds to 420. Otherwise, the answer is no and method 400 proceeds to 422.

At 422, method 400 determines engine spark advance based on the quotient determined at 410. In one example, the engine spark advance is determined by multiplying the quotient and the engine torque produced at stoichiometric conditions determined at 408 to provide a desired engine torque change. The desired engine torque change is added to the difference in engine torque between engine torque at base spark timing (e.g., spark timing at the present engine speed and load without adjustments for knock and other conditions) and engine torque at minimum spark advance for best torque (MBT) spark timing. The result is divided by engine torque at MBT and stoichiometric conditions to provide an engine torque scalar. The engine torque scalar is used to index an empirically determined function that describes spark timing relative to MBT spark timing as a function of the engine torque scalar. The function outputs the revised engine spark timing that includes the base spark timing and the spark timing adjustment for the engine torque increase or decrease resulting from engine air-fuel modulation. Method 400 proceeds to exit after the revised spark timing is output.

At 420, method 400 determines DISG or motor torque in response to the quotient determined at 410 and battery SOC. Additionally, method 400 determines engine spark advance based on DISG motor torque and the quotient determined at 410. The DISG or motor torque responsive to the quotient determined at 410 is determined as described at 416; however, the DISG or motor torque is reduced in response to the battery SOC. In one example, DISG or motor torque is reduced a predetermined amount based on an empirically determined function that reduces DISG or motor torque proportionately with an amount of battery SOC that is less than the first threshold SOC. In other examples, the DISG or motor torque may be reduced by a predetermined amount, 20% for example.

Engine spark timing is also adjusted. Since the DISG or motor torque is reduced responsive to battery SOC, engine spark timing is adjusted to provide engine torque in place of DISG or motor torque that is not available due to a low battery SOC. Thus, the engine spark timing may be modulated at the same rate as the engine air-fuel ratio. In one example, the engine spark timing is adjusted based on a difference between the torque provided by the DISG and the engine torque change that is induced by the varying engine air-fuel ratio. The engine spark timing is adjusted as described at 422 using the difference between torque provided by the DISG and the engine torque change that is induced by the varying engine air-fuel ratio as the basis for adjusting engine spark timing.

Thus, engine spark timing modulation amplitude (e.g., more or less spark advance) increases as motor torque modulation (e.g., motor torque amplitude) decreases in response to a decreasing battery state of charge. Alternatively, engine spark timing modulation amplitude decreases as motor torque modulation increases in response to an increasing battery state of charge. Method 400 proceeds to exit after engine spark timing and DISG torque are adjusted.

At 436, method 400 determines the engine torque ratio and the present expected engine torque as is described at 408. Method 400 proceeds to 438 after the engine torque ratio is determined.

At 438, method 400 divides the present expected engine brake torque by the engine torque ratio to produce a quotient as is described at 410. Method 400 proceeds to 440 after the quotient is determined.

Thus, the method of FIG. 4 provides for operating a driveline, comprising: varying an engine air-fuel ratio; and adjusting torque of a motor supplying torque to the driveline in response to varying the engine air-fuel ratio. The method includes where torque of the motor is adjusted to vary at a same rate as the engine air-fuel ratio is varied. For example, if the engine air-fuel ratio is varied between lean and rich at 2 Hz, the motor torque is varied at 2 Hz. The method includes where the motor torque is increasing when the engine torque is decreasing. The method includes where the motor torque is decreasing when the engine torque is increasing.

In some examples, the method further comprises adjusting the motor torque in response to battery state of charge. The method includes where the torque of the motor is adjusted to decrease by an amount of torque by which engine torque is increased in response to the engine air-fuel ratio. The method also includes where the torque of the motor is adjusted to increase by an amount of torque by which engine torque is decreased in response to the engine air-fuel ratio.

The method of FIG. 4 also provides for operating a driveline, comprising: varying an engine air-fuel ratio; and adjusting torque of a motor supplying torque to the driveline and spark timing in response to varying the engine air-fuel ratio. The method includes where a timing of a torque command to adjust torque of the motor is adjusted for fuel injection delay and fuel injection to engine power delay. The method includes where a timing of a torque command to adjust torque of the motor is adjusted for a torque delay of the motor. The method includes where adjusting torque of the motor is based on an engine torque ratio. The method includes where the engine torque ratio is based on engine torque when the engine is combusting a stoichiometric air-fuel mixture.

The method of FIG. 4 also includes where the motor torque is proportionately decreased as battery state of charge decreases when battery state of charge is less than a first threshold battery state of charge. The method also includes where motor torque changes based on engine air-fuel ratio changes are ceased when battery SOC is less than a second threshold battery state of charge.

The method of FIG. 4 also provides for a method for operating a driveline, comprising: not adjusting spark timing of an engine in response to engine air-fuel ratio changes when battery state of charge is greater than a first threshold battery state of charge; and adjusting spark timing of the engine in response to engine air-fuel ratio changes when battery state of charge is less than a second threshold battery state of charge. The method further comprises adjusting torque of a motor supplying torque to the driveline in response to the engine air-fuel ratio changes.

The method also includes where timing of commands to adjust the torque of the motor supplying torque to the driveline is adjusted in response to a fuel injection delay. The method includes where timing of commands to adjust the torque of the motor supplying torque to the driveline is adjusted in response to a fuel injection to engine torque delay. The method includes where adjusting spark timing of the engine includes retarding spark timing of the engine in response to the engine air-fuel ratio change providing a richer engine air-fuel mixture. The method includes where adjusting spark timing of the engine includes advancing spark timing of the engine in response to the engine air-fuel ratio change providing a leaner engine air-fuel mixture.

Referring now to FIG. 5, plots illustrating one method for compensating for delays when DISG or motor torque is adjusted to cancel changes in engine torque caused by modulating engine air-fuel ratio for improving catalyst efficiency are shown. The plots in FIG. 5 are aligned in time. The vertical marker at time T1 represents a time of an engine air-fuel ratio change that changes engine torque output.

The first plot from the top of FIG. 5 is a plot of engine air-fuel ratio versus time. The X axis represents time and time increases from the left side of FIG. 5 to the right side of FIG. 5. The Y axis represents engine air-fuel ratio and the engine air-fuel ratio is leaner in the direction of the Y axis arrow.

The second plot from the top of FIG. 5 represents cylinder strokes of a cylinder that is the first cylinder to be fueled since the change in engine air-fuel ratio at time T1. Each engine stroke is separated from other engine strokes via vertical bars. The vertical bars represent top-dead-center and bottom-dead-center piston positions. Engine exhaust strokes are abbreviated as EXH., engine expansion strokes are abbreviated EXPAN., engine compression strokes are abbreviated COMP., and engine intake strokes are labeled INTAKE.

At time T1, the desired engine air-fuel ratio transitions from a leaner mixture to a richer mixture. In this example, the fuel injection to the cylinder begins just after the engine air-fuel ratio changes and ends at intake stroke top-dead-center. The end of fuel injection is indicated and the fuel injection delay time is shown extending from the expansion stroke and through the exhaust stroke. In other examples, the end of fuel injection may be during the intake or compression stokes. The fuel injection to torque delay is shown beginning at top-dead-center intake stroke and it extends half way into the expansion stroke. Since the motor torque delay is an amount of time it takes for the motor to provide a desired torque once the desired torque is received by the motor, it is subtracted from the injection and fuel to torque delays. The quotient described at 410 and 412 is supplied to the motor or DISG at 505. Notice that 505 is earlier in time than where engine torque production is indicated. By commanding the DISG at 505, the DISG torque to compensate engine air-fuel ratio may cancel the engine torque variation caused by air-fuel variation. Thus, the delay from changing the engine air-fuel ratio to the beginning of engine torque production is incorporated into the timing of when a revised torque adjustment is provided to the DISG.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a driveline, comprising:
varying an engine air-fuel ratio; and
adjusting torque of a motor supplying torque to the driveline and spark timing in response to varying the engine air-fuel ratio, where adjusting torque of the motor is based on an engine torque ratio, where the engine torque ratio is based on engine torque when the engine is combusting a stoichiometric air-fuel mixture, and where engine spark timing modulation increases as motor torque modulation decreases in response to decreasing battery state of charge.

2. The method of claim 1, where a timing of a torque command to adjust torque of the motor is adjusted based on fuel injection delay and fuel injection to engine power delay.

3. The method of claim 1, where a timing of a torque command to adjust torque of the motor is adjusted based on a torque delay of the motor.

4. The method of claim 1, where the motor torque is proportionately decreased as battery state of charge decreases when battery state of charge is less than a first threshold battery state of charge.

5. The method of claim 1, where motor torque changes based on engine air-fuel ratio changes are ceased when battery state of charge is less than a threshold battery state of charge.

6. A method for operating a driveline, comprising:
varying an engine air-fuel ratio; and
adjusting torque of a motor supplying torque to the driveline and spark timing in response to varying the engine air-fuel ratio, where motor torque changes based on engine air-fuel ratio changes are ceased when battery state of charge is less than a non-zero threshold battery state of charge.

* * * * *